United States Patent [19]

Franke

[11] 4,255,048
[45] Mar. 10, 1981

[54] DIRECTION SENSITIVE LASER VELOCIMETER

[75] Inventor: John M. Franke, Norfolk, Va.

[73] Assignee: The United States of America as represented by the Administrator of the National Aeronautics and Space Administration, Washington, D.C.

[21] Appl. No.: 27,558

[22] Filed: Apr. 6, 1979

[51] Int. Cl.³ .............................................. G01P 3/36
[52] U.S. Cl. .................................. 356/28.5; 356/356; 356/358
[58] Field of Search ................... 356/5, 28, 28.5, 356, 356/358, 4.5

[56] References Cited

U.S. PATENT DOCUMENTS

| 3,024,456 | 3/1962 | Varian et al. | 343/9 |
| 3,360,987 | 1/1968 | Flower et al. | 356/5 |
| 3,601,491 | 8/1971 | Vaniz | 356/28.5 |
| 3,753,616 | 8/1973 | Goethert | 356/28.5 |
| 3,771,875 | 11/1973 | Russo | 356/358 |
| 3,838,924 | 10/1974 | Flower et al. | 356/28.5 |
| 3,915,572 | 10/1975 | Orloff | 356/28.5 |

Primary Examiner—S. C. Buczinski
Attorney, Agent, or Firm—William H. King; John R. Manning; Howard J. Osborn

[57] ABSTRACT

A laser velocimeter that determines the direction of movement of particles. A laser produces a transmitted beam that illuminates the volume under investigation. The backscattered light is divided into two equal intensity beams. A first part of a sample of the transmitted beam is mised with one of the two equal intensity beams and applied to a first photodetector. A second part of the sample is phase shifted by 90°, mixed with the other of the two equal intensity beams and applied to a second photodetector. The output of the first photodetector is phase shifted by −90° and then multiplied with the output of the second photodetector to produce a signal indicative of direction of movement.

4 Claims, 3 Drawing Figures

DIRECTION SENSITIVE LASER VELOCIMETER

ORGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

The invention relates generally to laser velocimetry and more specifically concerns a direction sensitive laser velocimeter.

A serious limitation of prior laser velocimeters has been their inability to accurately indicate the direction of movement of particles in a sample volume under investigation. Several techniques for determining the direction of movement have been proposed and demonstrated. These techniques include color, polarization or frequency shifting to deduce direction. A disadvantage of the color technique is that it requires a two-color laser. A disadvantage of the polarization technique is that the polarizations are degraded by the optical elements and windows. A disadvantage of the frequency shifting techniques is that it has a narrow Doppler range.

The primary object of this invention is to provide a laser velocimeter that accurately indicates the direction of movement of particles in a sample under investigation.

Another object of this invention is to provide an optical technique for determining the direction of movement in laser velocimetry that lessens the disadvantages of prior art techniques.

Other objects and advantages of this invention will become apparent hereinafter and in the drawings.

SUMMARY OF THE INVENTION

This invention is similar to the technique used in U.S. Pat. No. 3,024,456 to determine the direction of relative motion of an object. However, in the present invention optical frequencies and elements are used instead of microwaves frequencies and elements making it suitable for use in laser velocimetry.

The invention includes a laser that produces a transmitted beam for illuminating a sample volume under investigation. A first optical means collects the backscattered light from the sample volume and splits the collected light into two equal intensity beams with one beam directed to a first photodetector and with the other beam directed to a second photodetector. A second optical means samples the transmitted beam and mixes the sample with the two equal intensity beams. A phase shifter shifts the phase of the output of the first photodetector by 90°. A multiplier multiplies the output of the phase shifter by the output of second photodetector to obtain a signal that is indicative of the direction of motion of the particles in the sample volume.

In a first embodiment of the invention, the second optical means mixes part of the sample directly with one of the two equal intensity beams. The remainder of the sample is shifted in phase and then mixed with the other of the two equal intensity beams. In a second embodiment of the invention, the sample is fifty percent of the transmitted beam. The sample is reflected by a slightly tilted mirror and recombined with the transmitted beam causing finite fringes to appear at the two photodetectors.

DETAILED DESCRIPTION OF THE INVENTION

Figure 1:
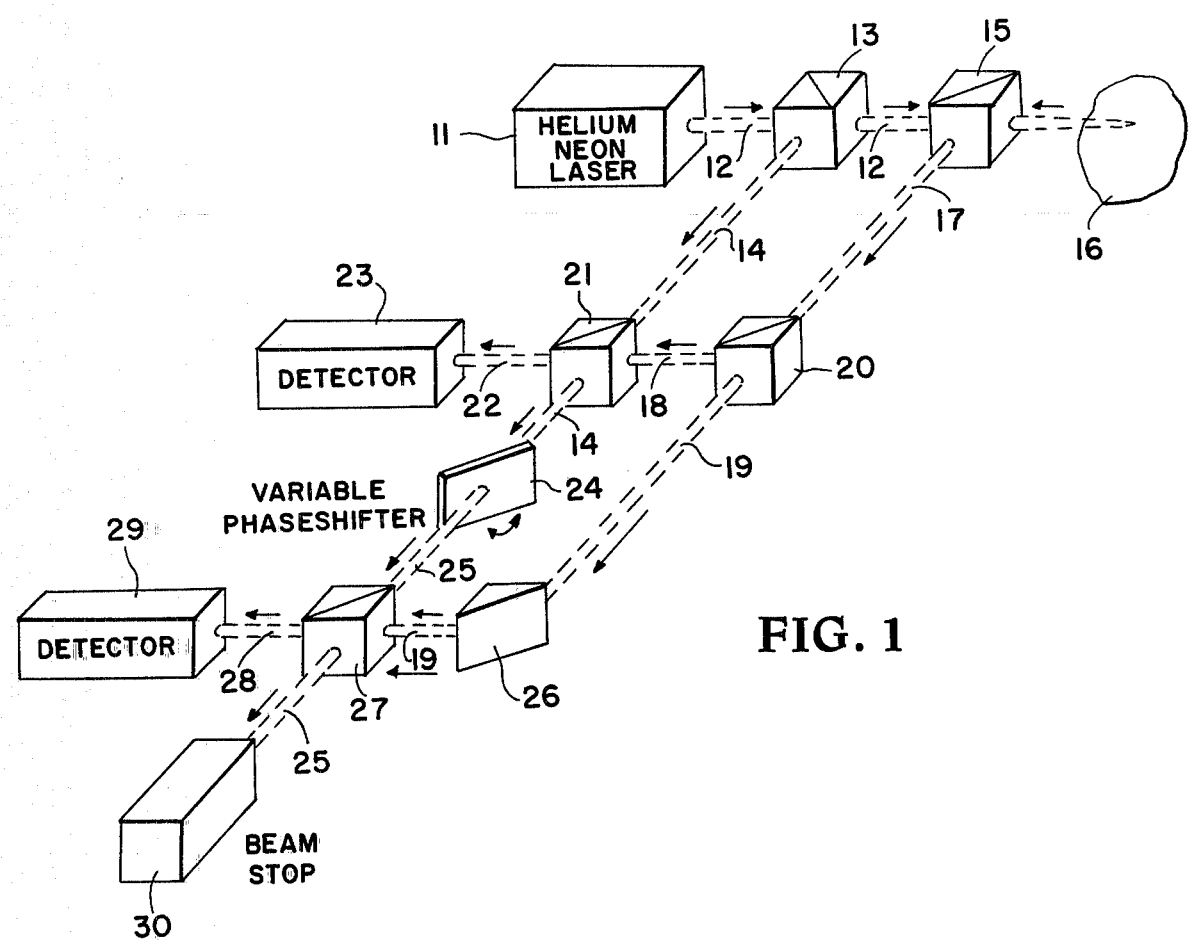
FIG. 1 is a schematic drawing of the optical portion of a first embodiment of the invention.

Turning now to the embodiment of the invention selected for illustration in FIG. 1 of the drawings, the number 11 designates a helium neon laser. Laser 11 produces a transmitted beam 12 which is sampled by a low reflectance beamsplitter 13 to form a sample beam 14. Beam 12, after it passes through beamsplitter 13, passes through a 50—50 beamsplitter 15 and illuminates a sample volume 16. The backscattered radiation is collected and reflected by beamsplitter 15 to form beam 17. Beam 17 is split into two equal intensity beams, 18 and 19, by a 50—50 beamsplitter 20. Beam 14 is heterodyned with beam 18 by means of a low reflectance beamsplitter 21 to form a beam 22 which is detected by a photodiode detector 23.

Beam 14, after it passes through beamsplitter 21, is shifted in phase by a variable phase shifter 24 to form beam 25. Beam 25 is heterodyned with beam 19, after it is reflected by a mirror 26, by means of a low reflectance beamsplitter 27 to form a beam 28 which is detected by a photodiode detector 29. Variable phase shifter 24 is used to produce an effective phase delay of 90° between the sampled transmitted beam to detector 23 and the sampled transmitted beam to detector 29. Beam 25 after it passes through beamsplitter 27 is stopped by a beam stop 30.

Figure 2:
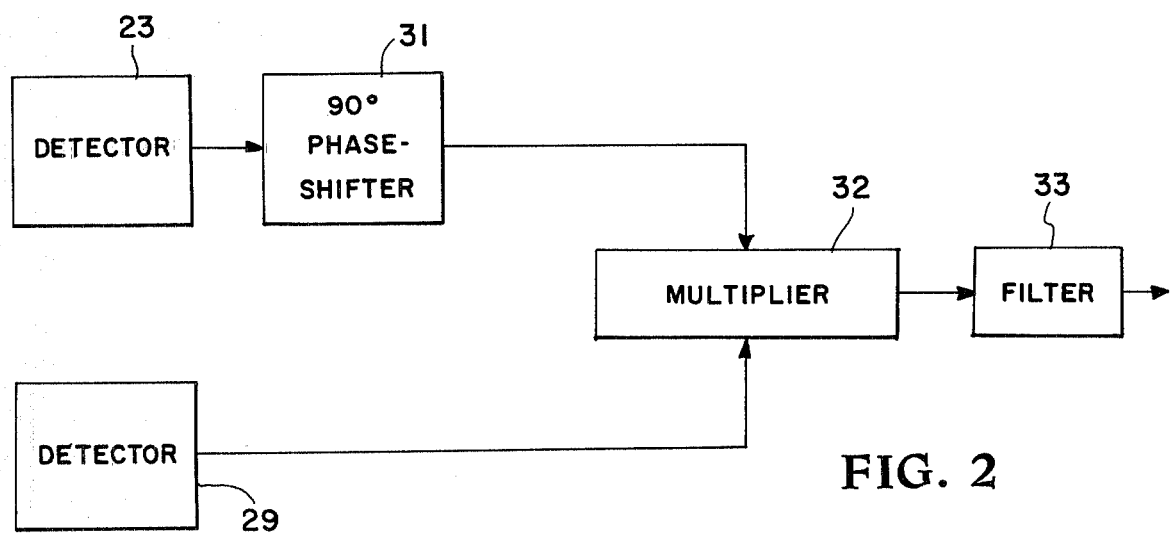
FIG. 2 is a block diagram of the electrical portion of the invention.

The electrical output of detector 23, as shown in FIG. 2, is applied to a 90° phaseshifter 31 to provide a 90° phase shift. The outputs of phaseshifter 31 and detector 29 are applied to a multiplier or mixer 32 where the two outputs are multiplied together. The output of multiplier 32 is filtered by a filter 33 to remove the AC component thereby providing an output signal that is indicative of the direction of movement of the particles in sample 16.

In the operation of this invention, if a particle in the sample volume 16, is approaching, the detector outputs $S_{23}$ and $S_{29}$ are:

$$S_{23} = \cos\left(\frac{4\pi}{\lambda} Kt\right)$$

$$S_{29} = \cos\left(\frac{4\pi}{\lambda} Kt + \frac{\pi}{2}\right)$$

K being the speed of the particle, and $\lambda$ is the wavelength of laser 11.

For a receding particle:

$$S_{23} = \cos\left(\frac{4\pi}{\lambda} Kt\right)$$

-continued $$S_{29} = \cos\left(\frac{4\pi}{\lambda} Kt - \frac{\pi}{2}\right)$$

With an electronic phase shift of $-90°$ inserted in the detector 23 output by phaseshifter 31, then for an approaching particle:

$$S_{23} = \cos\left(\frac{4\pi}{\lambda} Kt - \frac{\pi}{2}\right) = \sin\left(\frac{4\pi}{\lambda} KT\right)$$

$$S_{29} = \cos\left(\frac{4\pi}{\lambda} Kt + \frac{\pi}{2}\right) = -\sin\left(\frac{4\pi}{\lambda} Kt\right)$$

and for a receding particle:

$$S_{23} = \sin\left(\frac{4\pi}{\lambda} Kt\right)$$

$$S_{29} = \sin\left(\frac{4\pi}{\lambda} Kt\right)$$

Taking the product of the two outputs by multiplier 32 will now yield the direction of the particle. For an approaching particle:

$$(S_{23})(S_{29}) =$$

$$\left(\sin\left(\frac{4\pi}{\lambda} Kt\right)\right)\left(-\sin\left(\frac{4\pi}{\lambda} Kt\right)\right) =$$

$$-\tfrac{1}{2} + \tfrac{1}{2}\cos\left(\frac{8\pi}{\lambda} Kt\right)$$

after filtering, $(S_{23})(S_{29}) = -\tfrac{1}{2}$ and for a receding particle:

$$(S_{23})(S_{29}) =$$

$$\left(\sin\left(\frac{4\pi}{\lambda} Kt\right)\right)\left(\sin\left(\frac{4\pi}{\lambda} Kt\right)\right) =$$

$$\tfrac{1}{2} - \tfrac{1}{2}\cos\left(\frac{8\pi}{\lambda} Kt\right)$$

after filtering, $(S_{23})(S_{29}) = \tfrac{1}{2}$

In the embodiment of the invention shown in FIG. 2, a helium neon laser 40 produces a beam 41. Beam 41 is divided into two equal intensity beams 42 and 43 by a 50—50 beamsplitter 44. Beam 42 illuminates a sample volume 45 and beam 43 is directed onto a mirror 46. Mirror 46 is slightly tilted about a vertical axis such that the plane of mirror 46 is not exactly perpendicular to beam 43. The backscattered radiation from sample volume 45 and the beam 43 reflected by mirror 48 are collected by beamsplitter 44 to form a beam 47. Beam 47 is divided into two equal intensity beams, 48 and 49, by a 50—50 beamsplitter 50. Beam 48 is detected by detector 23 and beam 49 is detected by detector 29.

Detector 23 and 29 are connected in an electrical circuit as shown in FIG. 2.

Figure 3:
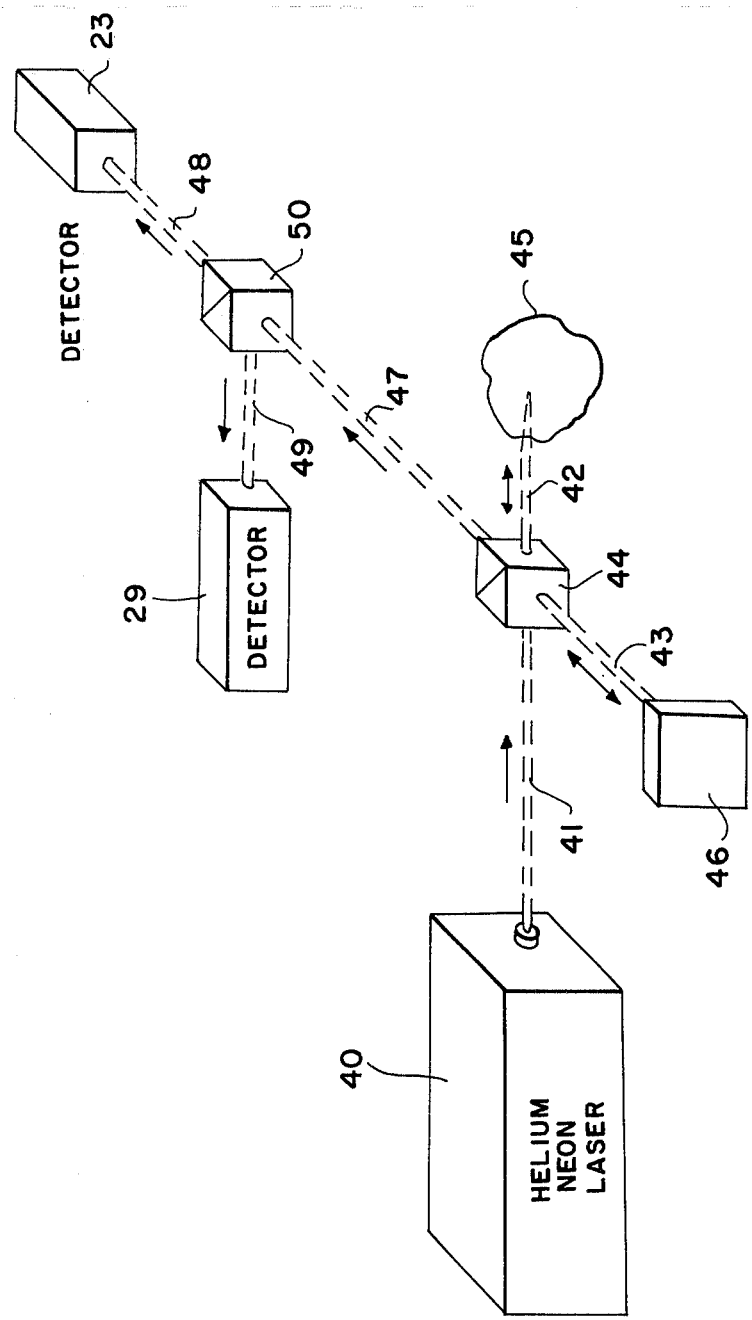
FIG. 3 is a schematic drawing of the optical portion of a second embodiment of the invention.

In the operation of the embodiment of the invention shown in FIG. 3, with mirror 46 titled about a vertical axis a finite number of fringes are formed. Detector 23 and 29 are placed such that their relative positions on a line perpendicular to the fringes are separated by one fourth of a fringe spacing. A fringe spacing is the distance between two adjacent fringes. The output from the electronic processor in FIG. 2 is identical to the case for infinite fringes as in FIG. 1. This embodiment is wasteful of energy but is easier to visualize. If a particle is moving away, the fringes move in one direction and if a particle is approaching, the fringes move in the other direction.

The advantages of this invention are that it requires only a one color laser, it inherently allows a broader Doppler range and it eliminates the problem of polarization degradation.

I claim:

1. An improvement in a laser velocimeter comprising:
a laser that produces a transmitted beam for illuminating a sample volume that is under investigation;
first and second photodetectors for producing electrical signals proportional to the light that strikes the detectors;
first optical means for collecting the backscattered light from said sample volume and splitting the collected light into two equal intensity beams with one beam directed to said first photodetector and with the other beam directed to said second photodetector;
second optical means for sampling said transmitted beam and for mixing the sample with said two equal intensity beams;
means for shifting by 90° the output signal from said first photodetector; and
means for multiplying the output signal from said first photodetector shifted by 90° with the output signal from said second photodetector whereby the signal at the output of the multiplying means is indicative of the direction of the movement of particles in said sample volume.

2. An improvement in a laser velocimeter according to claim 1 including filter means for passing only the direct current part of the signal at the output of said multiplying means whereby the polarity of the signal at the output of said filter means is indicative of the direction of movement of particles in said sample volume.

3. An improvement in a laser velocimeter according to claim 1 wherein said second optical means includes means for obtaining a sample beam from said transmitted beam; means for dividing said sample beam into a first sample beam and a second sample beam; means for mixing said first sample beam with said one beam; means for shifting the phase of said second sample beam by 90°; and means for mixing said second sample beam phase shifted by 90° with said other beam.

4. An improvement in a laser velocimeter according to claim 3 wherein said sample beam is less than half of said transmitted beam.

* * * * *